United States Patent
Conte et al.

(10) Patent No.: US 12,055,100 B2
(45) Date of Patent: Aug. 6, 2024

(54) RESTARTING A PLURALITY OF ENGINES OF AN AIRCRAFT

(71) Applicant: Airbus Operations SAS, Toulouse (FR)

(72) Inventors: Claudia Conte, Toulouse (FR); Quentin-Alexandre Flamant-Bati, Toulouse (FR); Xavier Collas, Toulouse (FR); Marie-Claire Pineri, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 21 days.

(21) Appl. No.: 17/841,175

(22) Filed: Jun. 15, 2022

(65) Prior Publication Data

US 2022/0403786 A1   Dec. 22, 2022

(30) Foreign Application Priority Data

Jun. 18, 2021   (FR) ........................................ 2106511

(51) Int. Cl.
*F02C 7/262* (2006.01)
*B64D 31/06* (2024.01)
(Continued)

(52) U.S. Cl.
CPC .............. *F02C 7/262* (2013.01); *B64D 31/06* (2013.01); *B64D 31/09* (2024.01); *F02C 6/00* (2013.01);
(Continued)

(58) Field of Classification Search
CPC ... F05D 2270/092–093; F05D 2270/13; F05D 2270/09–096; F05D 2260/85;
(Continued)

(56) References Cited

U.S. PATENT DOCUMENTS 3,129,643 A * 4/1964 Stearns ..................... F02C 9/32
                                                      91/382
9,248,907 B2 * 2/2016 Smiley ..................... F02C 7/26
(Continued)

FOREIGN PATENT DOCUMENTS

EP   2636596 A2   9/2013
FR   2942001 A1   8/2010

OTHER PUBLICATIONS

French Search Report; priority document.

*Primary Examiner* — Stephanie Sebasco Cheng
(74) *Attorney, Agent, or Firm* — Greer, Burns & Crain, Ltd.

(57) ABSTRACT

A system for automated management of in-flight restarting of engines of an aircraft includes controllers, each engine of the aircraft being managed by one of the controllers. A controller that detects an engine that has stopped: cuts off the energy supply of the engine and performs a windmill engine start. If at least one other engine has stopped, prioritization of engine restarting includes: collecting information concerning a state of health of each engine; determining from the information collected information representing a probability of restarting each stopped engine; determining a sequential order of restarting the stopped engines as a function of information representing the probability of restarting each stopped engine. Each stopped engine continues to be windmill started until selection of the engine in question in the sequential order of restarting the stopped engines. Thus, the operational status of the aircraft is improved as quickly as possible.

5 Claims, 4 Drawing Sheets

(51) Int. Cl.
 *B64D 31/09* (2024.01)
 *F02C 6/00* (2006.01)
 *F02C 9/42* (2006.01)
 *F02C 9/46* (2006.01)

(52) U.S. Cl.
 CPC ............... *F02C 9/42* (2013.01); *F02C 9/46* (2013.01); *F05D 2220/323* (2013.01); *F05D 2260/85* (2013.01); *F05D 2270/092* (2013.01); *F05D 2270/093* (2013.01); *F05D 2270/13* (2013.01); *F05D 2270/303* (2013.01); *F05D 2270/334* (2013.01)

(58) Field of Classification Search
 CPC ............... F05D 2270/013; F02C 7/262; F02C 7/26–277; F02C 6/00–206; F02C 9/42; F02K 3/12; F01D 21/00–20; F01D 19/00–02; B64D 31/06; B64D 31/09; B64D 31/12; B64D 31/14
 See application file for complete search history.

(56) References Cited

U.S. PATENT DOCUMENTS

| | | |
|---|---|---|
| 2013/0233977 A1 | 9/2013 | Smiley et al. |
| 2018/0201386 A1 | 7/2018 | Strauss et al. |
| 2022/0063826 A1* | 3/2022 | Hiett ................ B64D 27/10 |
| 2022/0396365 A1* | 12/2022 | Muldoon ............ B64D 27/16 |

* cited by examiner

RESTARTING A PLURALITY OF ENGINES OF AN AIRCRAFT

CROSS-REFERENCES TO RELATED APPLICATIONS

This application claims the benefit of the French patent application No. 2106511 filed on Jun. 18, 2021, the entire disclosures of which are incorporated herein by way of reference.

FIELD OF THE INVENTION

The present invention concerns the management of restarting aircraft engines in flight.

BACKGROUND OF THE INVENTION

Engines stopping in flight is a known incident in aeronautics. In the case of a turbojet engine, this phenomenon is referred to as a "flame out", indicating the cessation of combustion.

An engine stopping can have numerous causes: failure of supply (for example, lack of fuel in the case of a heat engine), surging, lack of oxygen at high altitude, ingestion (e.g., of birds) . . . .

It is not very probable that the incident in itself will lead to loss of control of the aircraft, because the latter are designed to continue to fly even in the event of engine failure. The remainder of the flight is nevertheless effected in a degraded mode: loss of thrust, partial loss of electric and/or hydraulic and/or pneumatic energy supply.

It is, therefore, incumbent on the pilot to attempt to restart an engine that has stopped in flight, as soon as they judge it prudent to do so. If a plurality of engines have stopped simultaneously, the pilot will seek to restart at least one engine to be able to land at a diversion airport. The pilot will attempt to restart the engines in turn until at least one engine is found that can be restarted. This procedure can take a long time, all the more so as the source of pneumatic or electric energy equipping the aircraft (depending on the technology of the engine starting systems equipping the aircraft) is not rated to supply sufficient energy in order to attempt to restart a plurality of engines in sequence in a brief time, which also delays the potential restarting of at least one engine.

It is then desirable to alleviate these disadvantages of the prior art. It is, in particular, desirable to provide a solution that makes it possible to accelerate the restarting of at least one engine if a plurality of engines of an aircraft have stopped in flight.

SUMMARY OF THE INVENTION

There is then proposed a method of restarting a plurality of engines that have stopped in flight among a set of N engines of an aircraft, N≥2, the method being implemented by a system for automated management of restarting engines in flight that includes controllers, each engine of the aircraft being managed by one of the controllers, in which each controller, which is controlling one engine i of the set, i=1, . . . , N, and which detects that the engine i has stopped, effects the following steps: cutting off the supply of energy to the engine i; effecting windmill starting of the engine i; verifying if at least one other engine of the set has stopped; if no other engine of the set has stopped, effecting (408) an attempt to restart the engine i. Moreover, if at least one other engine j, j=1, . . . , N, j≠i, of the set has stopped, at least one of the controllers effects an engine restarting prioritization including the following steps: collecting from the controllers controlling the engines information concerning a state of health of each engine; determining from the information collected information representing a probability of restarting each engine that has stopped; determining a sequential order of restarting the engines that have stopped as a function of the information representing the probability of restarting each engine that has stopped; and maintaining windmill starting of the engine i by the controller controlling the engine i until the engine i is selected in the sequential order of restarting the engines that have stopped. Because they are windmill started, the engines that have stopped are therefore returned to potential restarting conditions and the prioritization effected in this way enables the operational status of the aircraft to be improved as quickly as possible, if it is possible. If at least one engine can be restarted, appropriate selection of the engine to restart is achieved.

In accordance with one particular embodiment, the information collected includes: an indication of a mode of operation of the engine in question; an indication of vibrations sensed by sensors of the engine in question; an indication of the temperature sensed by sensors of the engine in question; an indication of the status of a starting system of the engine in question; and an indication of the energy supply status of the engine in question.

In accordance with one particular embodiment, the information representing the probability of restarting one of the engines is a health status score of the engine and the health status score depends on: a temperature margin of the engine relative to one or more first predefined thresholds; a peak vibration value sensed at the level of the engine during the flight relative to one or more second predefined thresholds; an operational status of the starting system of the engine; and an operational status of the energy supply of the engine.

In accordance with one particular embodiment, each controller which is controlling one engine i of the set, i=1, . . . , N, and that detects that the engine i has stopped effects the following steps: determining if auto-restarting of the engine i is in progress; if auto-restarting of the engine i is in progress, monitoring the progress of the auto-restarting of the engine i; if no auto-restarting of the engine i is in progress or if the auto-restarting of the engine i has failed, including the engine i in the engine restarting prioritization.

There is also proposed a computer program that can be stored on a medium and/or downloaded from a communication network in order to be read by a processor. This computer program includes instructions for implementing the aforementioned method in any one of its embodiments when the program is executed by the processor. There is also proposed an information storage medium storing this kind of computer program.

There is also proposed a system for automated management of restarting in-flight engines of an aircraft including a set of N engines, N≥2, including controllers, each engine of the aircraft being managed by one of the controllers, in which each controller controlling one engine i of the set, i=1, . . . , N, and that detects that the engine i has stopped includes electronic circuitry configured to implement the following steps: cutting off the supply of energy to the engine i; effecting windmill starting of the engine i;

verifying if at least one other engine of the set has stopped; if no other engine of the set has stopped, effecting an attempt to restart the engine i. Moreover, at least one of the controllers includes electronic circuitry configured if at least one other engine j, j=1, . . . , N, j≠i, of the set has stopped to implement an engine restarting prioritization including the following steps: collecting from the controllers controlling the engines information concerning a state of health of each engine; determining from the information collected information representing a probability of restarting each engine that has stopped; determining a sequential order of restarting the engines that have stopped as a function of the information representing the probability of restarting each engine that has stopped; and maintaining windmill starting of the engine i by the controller controlling the engine i until the engine i is selected in the sequential order of restarting the engines that have stopped.

There is also proposed an aircraft including a set of N engines, N≥2, and a system for automated management of in-flight restarting of engines as referred to hereinabove.

BRIEF DESCRIPTION OF THE DRAWINGS

The aforementioned features of the invention as well as others will become more clearly apparent on reading the following description of at least one embodiment, the description being given with reference to the appended drawings, in which.

DETAILED DESCRIPTION OF THE PREFERRED EMBODIMENTS

Figure 1:
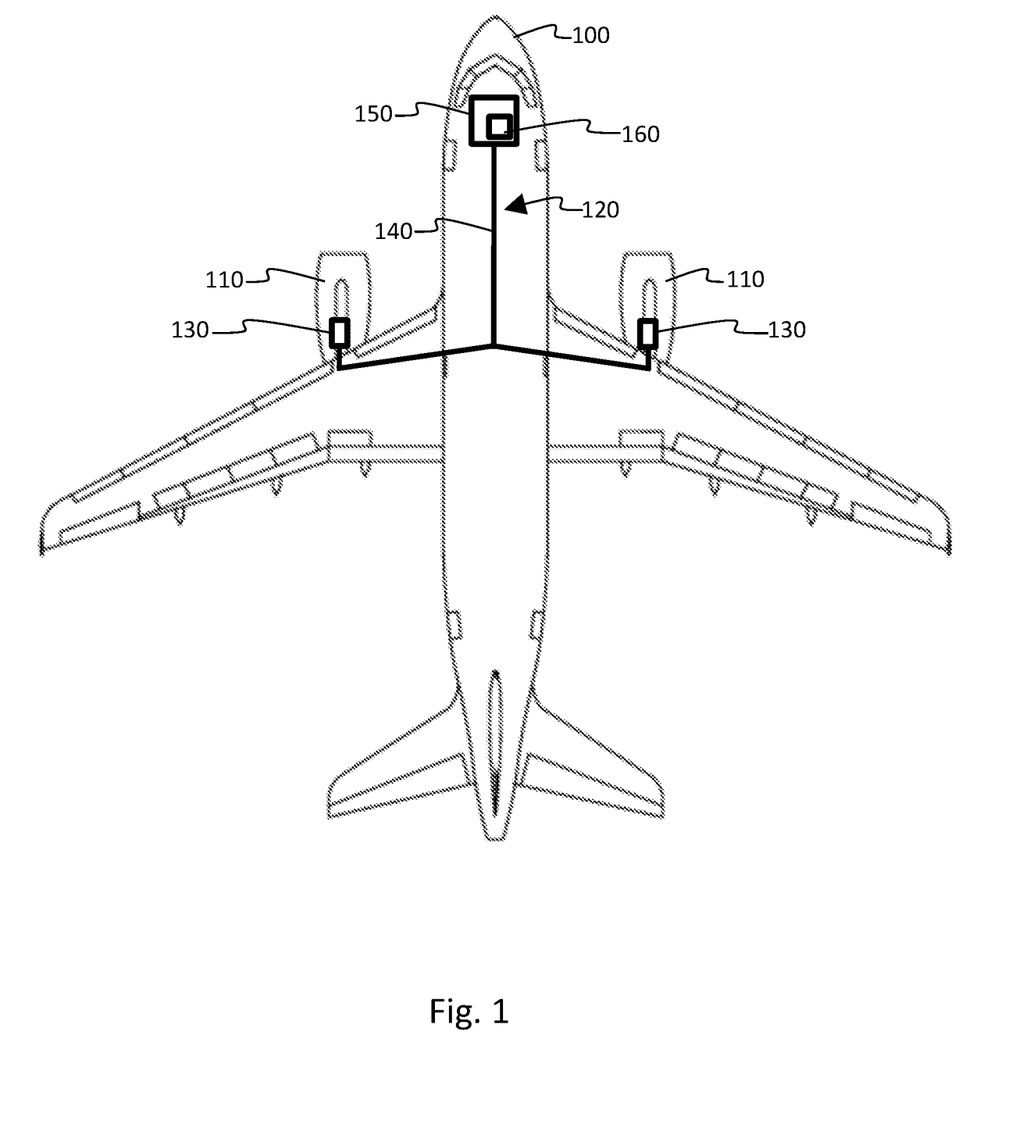
FIG. 1 illustrates diagrammatically, as seen from above, an aircraft equipped with a system for automated management of restarting aircraft engines in flight.

FIG. 1 illustrates diagrammatically, as seen from above, an aircraft 100 equipped with a set of N engines (N≥2) 110 and a system 120 for automated management of in-flight restarting of the engines.

The engines 110 are preferably turbojets. The engines 110 may nevertheless be of some other type, for example hydrogen engines.

The system 120 includes at least one controller 130 per engine. The controllers 130 are interconnected and connected to the avionics 150 by means of a communication system 140.

Note that most present-day engines are equipped with advanced electronic circuitry, with numerous sensors, that may include an auto-restart system.

As described in detail hereinafter, the system 120 implements a function of conjoint management of in-flight restarting of engines when a plurality of engines have stopped. An engine that has stopped is an engine in which the rotating parts are stationary, or an engine that supplies no thrust but the blower of which is rotating, driven by the air in the manner of a windmill (this is referred to as a windmill start). In contrast, an engine in the process of auto-restarting, during restarting (either by action of the pilot, or automatically), or in operation (the rotating parts are turning and the engine is supplying thrust, i.e., running), is not an engine that has stopped.

The function for conjoint management of in-flight restarting of engines can be implemented in parallel by the controllers 130 so that each controller 130 is able to determine independently, but in the same manner, what priority to give to which engine in the order of restarting the engines.

Alternatively, the system 120 further includes a central controller 160 integrated, for example, into the avionics 150 that determines what priority to give to which engine in the order of restarting the engines and instructs the controllers 130 accordingly.

Figure 2:
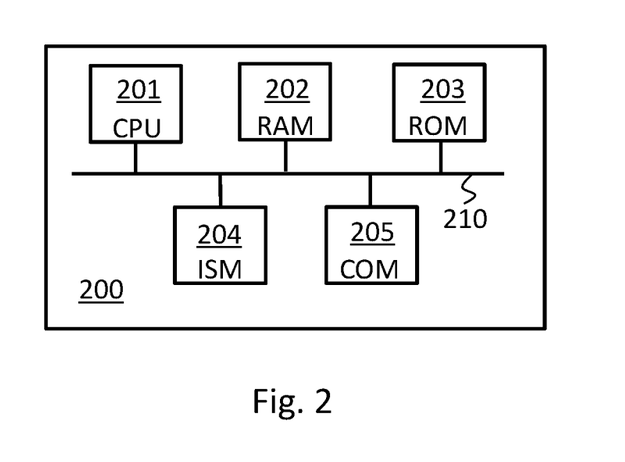
FIG. 2 illustrates diagrammatically one example of controller hardware architecture of the automated restarting management system.

FIG. 2 illustrates diagrammatically a controller hardware architecture 200 of the system 120, whether that be the central controller 160 and/or the controllers 130.

The controller 200 then comprises, connected by a communication bus 210: a processor or CPU (central processing unit) 201; a random access memory (RAM) 202; a read only memory (ROM) 203, for example a Flash memory; an information storage medium (ISM), such as a hard disk drive (HDD), or a storage medium reader such as an SD (secure digital) card reader 204; at least one communication interface 205 enabling the controller 200 to interact with other equipment on the aircraft 100 and more particularly with at least one other controller of the system 120.

The processor 201 is capable of executing instructions loaded into the RAM 202 from the ROM 203, from an external memory (not represented), from a storage medium, such as an SD card, or from a communication network (not represented). When the controller 200 is powered up the processor 201 is capable of reading instructions from the RAM 202 and executing them. These instructions form a computer program causing execution by the processor 201 of the behaviors, steps and algorithms described here.

Some or all of the behaviors, steps and algorithms described here can therefore be implemented in software form by execution of a set of instructions by a programmable machine such as a digital signal processor (DSP) or a microcontroller, or be implemented in hardware form by a machine or a dedicated component (chip) or a dedicated set of components (chipset), such as a field-programmable gate array (FPGA) or an application-specification integrated circuit (ASIC). The system 120 generally includes electronic circuitry adapted and configured to implement the behaviors, steps and algorithms described here.

Figure 3:
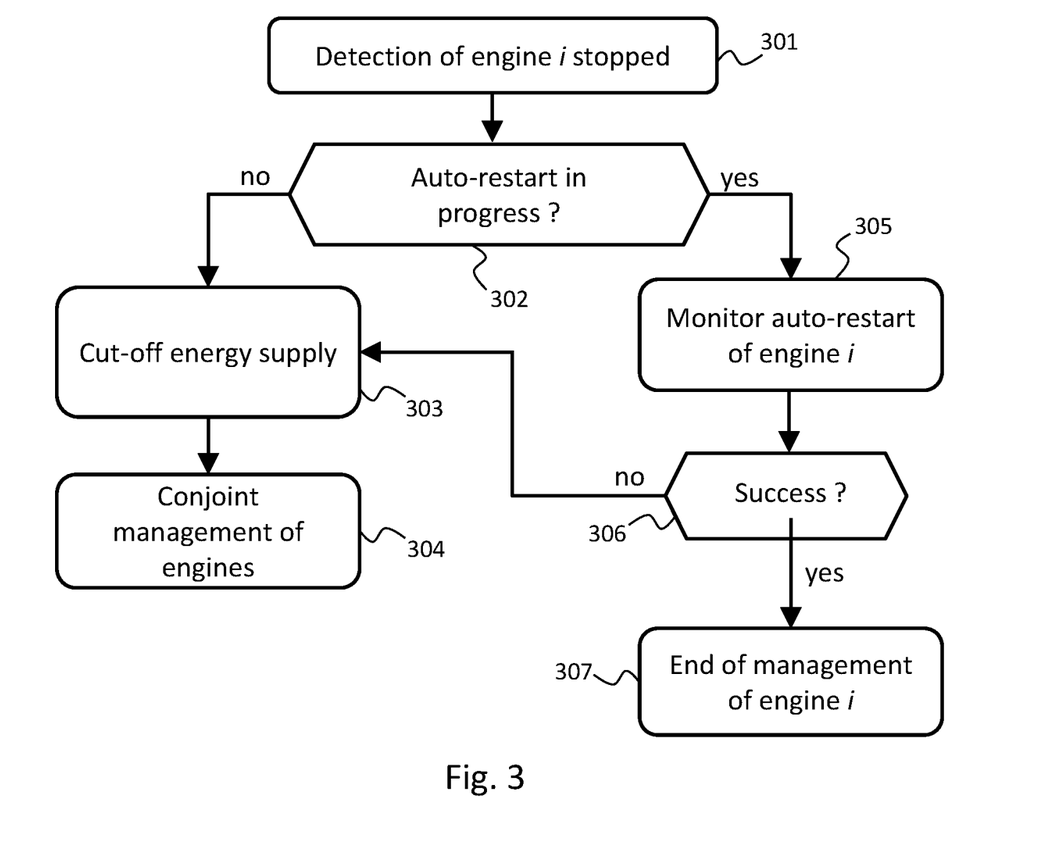
FIG. 3 illustrates diagrammatically an algorithm for management of in-flight restarting of an engine that has stopped.

FIG. 3 illustrates diagrammatically an algorithm for management of in-flight restarting of an engine that has stopped. The FIG. 3 algorithm is implemented by each controller 130.

In a step 301, the controller 130 controlling the engine i (i=1, . . . , N) detects that the engine i has stopped. As already indicated, the engines that equip modern aircraft are equipped with a multitude of sensors and advanced electronic circuitry enabling real-time collection and processing of a great deal of information concerning their operational status.

In step 302 the controller 130 controlling the engine i determines if auto-restarting of the engine i is in progress. Such auto-restarting of the engine i may, for example, have been triggered by another controller integrated into the engine i. For example, that other controller is provided and managed by the engine supplier (for example in a full authority digital engine control (FADEC) type system), and the controllers 130 are supplied and managed by the avionics supplier. In a combustion engine auto-restarting is typically effected by injection of kerosene and energization of the sparkplugs if sensors detect combustion failures. If auto-restarting is in progress step 305 is effected; if not step 303 is effected.

In step 303 the controller 130 controlling the engine i cuts off the energy supply (kerosene, hydrogen, electricity, . . . ) of the engine i. For example, the controller 130 controlling the engine i cuts off the supply of fuel (chemical energy) of the engine i and in the case of an electric engine the controller 130 controlling the engine i cuts off the electrical power (electrical energy) supply of the engine i. A tentative auto-restarting of the engine i by another controller (for example one integrated into the engine) would then be inoperative. The energy supply (kerosene, hydrogen, electricity . . . ) of the engine i is preferably cut-off upstream of the engine i (rather than in the engine i).

In a following step 304 the controller 130 controlling the engine i enters into a procedure for conjoint management of the engines so as to take into account a possible at least one engine 110 other than the engine i. The FIG. 3 algorithm is then terminated.

In step 305 the controller 130 controlling the engine i monitors the progress of the auto-restarting of the engine i. In step 306 the controller 130 controlling the engine i verifies if the auto-restarting of the engine i has succeeded. If so, step 307 is effected; otherwise, the algorithm switches to step 303 so as to cut off the energy supply and enter into the procedure for conjoint management of the engines. The engine i can thus be included in an engine restarting prioritization procedure.

In step 307 the controller 130 controlling the engine i terminates the management of in-flight restarting of the engine i.

Figure 4:
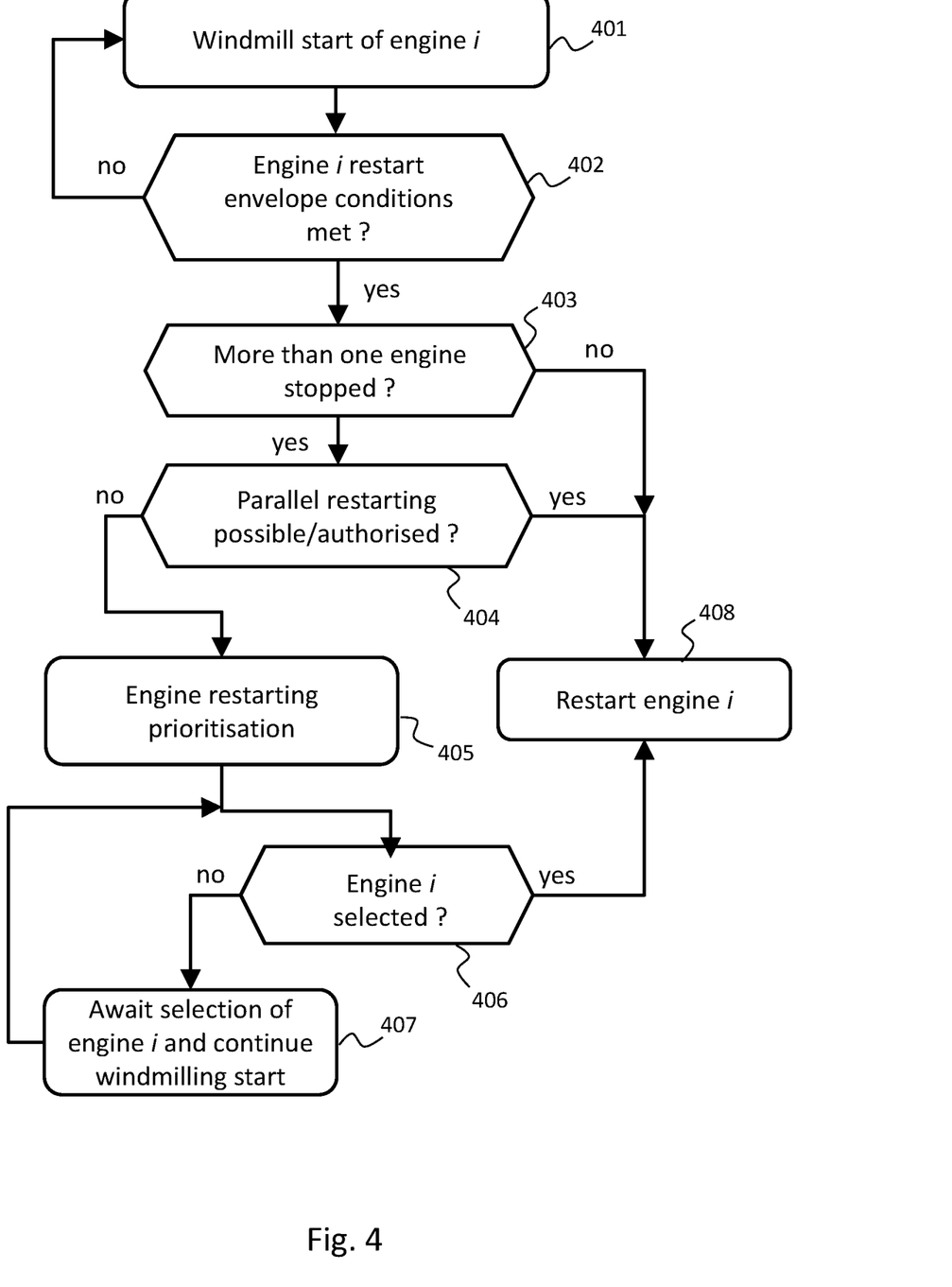
FIG. 4 illustrates diagrammatically an algorithm for conjoint management of in-flight restarting of a plurality of engines.

FIG. 4 illustrates schematically an algorithm for conjoint management of in-flight restarting of a plurality of engines that have stopped. The FIG. 4 algorithm provides a detailed particular embodiment of the aforementioned step 304. At the start of the FIG. 4 algorithm the energy supply of the engine i is cut off (after step 303).

In step 401 the controller 130 controlling the engine i effects a windmill start of the engine i induced by the movement of the aircraft through the air. A windmill engine start refers to rotation of the engine because of the relative air speed. On a turbojet, the windmill start causes the blower to turn with the aim of driving the N2 shaft. When a compression threshold (e.g., 20%) is reached, energization of the spark plugs may be effected to restart the engine without having recourse to a (pneumatic or electric) starting system, unlike starting the engine on the ground (a longer procedure than a windmill start).

In step 402 the controller 130 controlling the engine i verifies if the aircraft 100 meets the conditions to enable engine restarting conforming to the applicable engine restart envelope. The characteristics of the engine restart envelope are stored in a memory available to the controller 130. The engine restart envelope is a profile that depends at least on information as to the air speed and altitude of the aircraft 100 and that defines the conditions to be met for the probability of restarting the engine i to be greater than or equal to a predefined threshold. This in-flight information is supplied by the avionics 150 of the aircraft 100. The engine restart envelope can define profile portions specifically for restarting assisted by a starting system (whether this be a starter or a pneumatic starting system) and for a windmill start.

In step 403 the controller 130 controlling the engine i verifies if a plurality of engines of the aircraft 100 have stopped. The controllers 130 are interconnected or connected to the central controller 160 so that each controller 130 is able to obtain information concerning the current operating mode of each engine 110 of the aircraft 100 as well as other information relating to the engines 110 (vibrations sensed, temperature, energy supply . . . ). If a plurality of engines 110 have stopped step 404 is executed; if not step 408 is executed.

In step 404 the controller 130 controlling the engine i verifies if parallel restarting of the engines that have stopped is possible and/or authorized. For example, the controller 130 controlling the engine i verifies if the aircraft 100 has available sufficient electrical energy to carry out this parallel starting. In accordance with another example the controller 130 controlling the engine i verifies if the aircraft 100 is of a type authorizing simultaneous restarting of two or more engines. This information is supplied by the avionics 150 of the aircraft 100. If parallel restarting of the engines that have stopped is possible step 408 is effected; if not step 405 is effected.

Step 404 is optional. If it is omitted (for example because it is pre-established in the controller 130 that if a plurality of engines have stopped a stopped engine restarting prioritization procedure is obligatory), the algorithm moves from step 403 to step 405 if a plurality of engines 110 have stopped.

In step 405 the controller 130 controlling the engine i enters into a procedure for prioritizing restarting of the engines that have stopped. This procedure aims to define in which sequential order the engines that have stopped have to be restarted to maximize the chances of restarting at least one engine 110 of the engines that have stopped. The procedure for prioritizing the restarting of the engines that have stopped may be effected in the same manner (to obtain the same result) by each of the controllers 130. Alternatively, the procedure for prioritizing restarting of the engines that have stopped may be centralized at the level of the central controller 160, which then instructs the controllers 130 accordingly.

One particular embodiment of step 405 is described hereinafter with reference to FIG. 5.

In step 406 the controller 130 controlling the engine i then verifies if the engine i is selected for restarting in accordance with the sequential order determined in step 405. If so step 408 is executed; if not step 407 is executed.

In step 407 the controller 130 controlling the engine i waits its turn to be selected in accordance with the sequential order determined in step 405. When the controller 130 controlling the engine i receives information (from another controller 130 or from the central controller 160) indicating the end of restarting of another engine 110 (whether successful or not), the controller 130 controlling the engine i repeats step 406 to determine if its turn has arrived. As long its turn to be selected has not arrived (and as long as no instruction to abandon restarting has been received), the controller 130 controlling the engine i maintains the windmill starting of the engine i, in order for the engine i to be in the best possible conditions for restarting.

In step 408 the controller 130 controlling the engine i attempts restarting of the engine i. The controller 130 controlling the engine i then reactivates the energy supply that was cut off in step 303. The controller 130 of the engine i informs the other controllers 130, i.e., the controllers 130 controlling the engines j (j=1, . . . , N, j≠i), of the progress of the restarting of the engine i. The attempted restarting may be done with or without the assistance of a starting system, depending on the conditions of the aircraft 100 relative to the engine restart envelope.

In the event that the attempted restarting of the engine i fails the engine i gives up its turn and priority is then given to the next engine in the sequential order determined in step 405. In one particular embodiment a new prioritization of the restarting of the engines that have stopped is effected that takes into account the failed restarting of the engine i. This makes it possible to take into account a new situation of the aircraft 100 and consequent revision of the prioritization of any remaining engines to be restarted.

Figure 5:
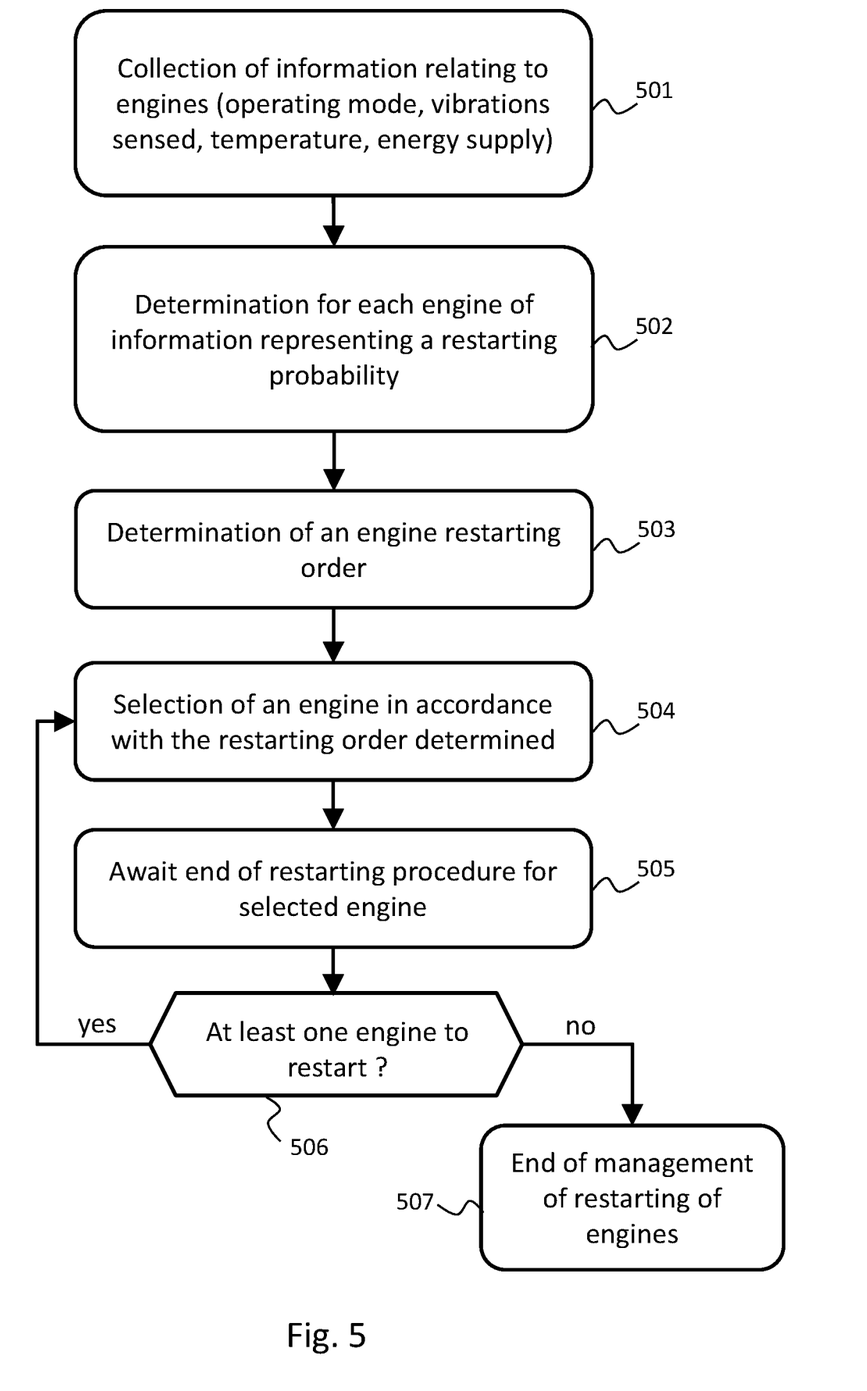
FIG. 5 illustrates diagrammatically an in-flight restarting prioritization algorithm for a plurality of engines.

FIG. 5 illustrates diagrammatically an algorithm for prioritization of in-flight restarting of a plurality of engines that have stopped. The FIG. 5 algorithm provides one particular detailed embodiment of the aforementioned step 405. Consider by way of illustration that the FIG. 5 algorithm is implemented by the central controller 160.

In step 501 the central controller 160 collects information relating to a state of health of each engine 110. This information includes an indication of the operating mode of the engine in question: stopped, auto-restart in progress, windmill start, restart in progress, running. This information preferably includes an indication of vibrations sensed by the sensors of the engine 110 in question. This information preferably includes an indication of the temperature sensed by sensors of the engine 110 in question. This information preferably includes an indication of the energy supply status of the engine 110 in question. This information preferably includes an indication of the status of the starting system of the engine 110 in question. The information may be collected or alternatively collected systematically or alternatively collected as required. For example, the information relating to the status of the starting system of the engine 110 can be collected by the central controller 160 only if restarting of the engine 110 in question using the starting system is envisaged.

In step 502 the central controller 160 determines, for each engine 110 of the set of engines of the aircraft 100 that has stopped (given its operational status), information representing a probability of restarting the engine 110 on the basis of the information collected in step 501.

In one particular embodiment the information representing the probability of restarting the one engine 110 is a health status score of the engine 110. The health status score is, for example, a weighted sum of a set of parameters relating to the aptitude of the engine 110 to be restarted. The health status score then depends on a temperature margin of the engine relative to one or more predefined thresholds (e.g., relative to an acceptable theoretical upper limit to prevent the engine from being damaged), to a peak vibration value sensed at the level of the engine 110 during flight (which could be symptomatic of a weakness of an engine shaft) relative to one or more predefined thresholds, to an operational status of the starting system of the engine 110, to an operational status of the energy supply (fuel supply, electric supply . . . ) of the engine 110. The health status score may take into account the engine restart envelope. In effect, an engine that would require restarting by the starting system in the light of the engine restart envelope given the altitude and the speed of the aircraft 100 and for which the collected information indicates a failed starting system does not take priority in the order of restarting the engines that have stopped.

Other criteria may be used provided that they address a parameter relating to the aptitude of the engine 110 to be restarted.

In step 503 the central controller 160 determines an order of restarting the stopped engines as a function of the information representing the probability of restarting each stopped engine 110. The higher the probability of restarting the one engine 110, the higher the priority of that engine 110 in the engine restarting order.

In step 504 the central controller 160 selects the highest priority engine 110 according to the restarting order determined in step 503. The controller 130 controlling that engine then proceeds to attempt restarting of the engine by the above steps 407 and 408.

In step 505 the central controller 160 waits for the end of the procedure for restarting the engine selected in step 504, whether it succeeds or fails.

In step 506 the central controller 160 verifies if there still remains at least one engine to restart. If so step 504 is repeated and the next highest priority engine 110 in accordance with the restarting order determined in step 503 is selected for restarting. In one particular embodiment, if there remains more than one engine to restart the algorithm loops to step 501, thus making it possible to take into account any changes (operating mode, temperature . . . ) occurring since the last execution of step 503. If there remains no engine to restart step 507 is executed.

In one particular embodiment, the central controller 160 awaits confirmation from the cockpit of the aircraft 100 via the avionics 150 before attempting to restart another stopped engine.

In step 507 the central controller 160 terminates the stopped engine restarting procedure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of restarting a plurality of engines that have stopped in flight among a set of N engines of an aircraft, N≥2, the method being implemented by a system for automated management of restarting engines in flight that includes a plurality of controllers, each engine among said set of N engines of the aircraft being managed by a corresponding controller of said plurality of controllers, in which each controller of said plurality of controllers which is controlling one engine i of said set of N engines, i=1, . . . , N, and which detects that said one engine i has stopped, executes the following steps:

cutting off a supply of energy to said one engine i;
effecting windmilling of said one engine i; and
identifying at least one other engine of said set of N engines that has stopped;
wherein at least one of said plurality of controllers effects an engine restarting prioritization of all of the plurality of engines that have stopped of said set of N engines, including the following steps:
collecting information concerning a state of health of each engine of said set of N engines from the plurality of controllers controlling said set of N engines;
determining a probability of restarting each engine of all of the plurality of engines that have stopped of said set of N engines from the information collected concerning the state of health of each engine of said set of N engines, wherein restarting each engine of all of the plurality of engines that have stopped of said set of N engines uses a source of energy equipped on the aircraft;

determining a sequential order of restarting all of the plurality of engines that have stopped of said set of N engines as a function of the information representing the probability of restarting each engine of all of the plurality of engines that have stopped of said set of N engines; and maintaining windmilling of the one engine i by the corresponding controller of said plurality of controllers, until said one engine i is selected from the sequential order of restarting all of the plurality of engines that have stopped of said set of N engines for restarting using the source of energy equipped on the aircraft.

2. The method according to claim 1, in which the information collected from the plurality of controllers includes:

an indication of a mode of operation of each engine of said set of N engines;

an indication of vibrations sensed by sensors of each engine of said set of N engines;

an indication of a temperature sensed by sensors of each engine of said set of N engines;

an indication of a status of a starting system of each engine of said set of N engines; and an indication of an energy supply status of each engine of said set of N engines.

3. The method according to claim 2, wherein the probability of restarting each engine of all of the plurality of engines that have stopped of said set of N engines is a health status score of each engine of all of the plurality of engines that have stopped of said set of N engines and in which the health status score depends on:

a temperature margin of each engine of all of the plurality of engines that have stopped of said set of N engines relative to one or more first predefined thresholds;

a peak vibration value sensed at a level of each engine of all of the plurality of engines that have stopped of said set of N engines during the flight relative to one or more second predefined thresholds;

an operational status of the starting system of each engine of all of the plurality of engines that have stopped of said set of N engines; and an operational status of the energy supply of each engine of all of the plurality of engines that have stopped of said set of N engines.

4. A system for automated management of restarting, in flight, engines of an aircraft, the aircraft including a set of N engines, N>2, said system including a plurality of controllers, each corresponding engine of the set of N engines of the aircraft being managed by a corresponding controller of said plurality of controllers, wherein each corresponding controller of said plurality of controllers controlling the corresponding engine i of said set of N engines, i=1, . . . , N detects whether said corresponding engine i has stopped, and includes electronic circuitry configured to implement the following steps:

cutting off a supply of energy to said corresponding engine i;

effecting windmilling of said corresponding engine i;

verifying whether at least one other engine j, j=1, . . . , N, j≠i, of said set of N engines that has stopped; and if the at least one other engine has not stopped, effecting an attempt to restart said corresponding engine i, using a source of energy equipped on the aircraft; and wherein at least one of said plurality of controllers includes electronic circuitry configured to implement an engine restarting prioritization if the at least one other engine j of said set of N engines has stopped, including the following steps:

collecting, from the plurality of controllers, information concerning a state of health of each engine of the set of N engines;

determining a probability of successfully restarting each engine of all engines of the set of N engines that have stopped using the source of energy equipped on the aircraft, wherein the probability is calculated from the information concerning the state of health of each engine of the set of N engines; and determining a sequential order of restarting all engines of the set of N engines that have stopped as a function of the probability of successfully restarting each engine of all engines of the set of N engines that have stopped, wherein restarting all engines of the set of N engines that have stopped uses the source of energy equipped on the aircraft; and maintaining windmilling of the corresponding engine i by the corresponding controller, of said plurality of controllers, until said corresponding engine i is selected for restarting, from the sequential order of restarting each engine of all engines of the set of N engines that have stopped, using the source of energy equipped on the aircraft.

5. The system for automated management of restarting, in flight, engines, according to claim 4, incorporated onto an aircraft including a set of N engines, N>2.

* * * * *